US010079810B1

(12) United States Patent
Moore et al.

(10) Patent No.: US 10,079,810 B1
(45) Date of Patent: Sep. 18, 2018

(54) DECRYPTION AND ANALYSIS OF NETWORK TRAFFIC USING KEY MATERIAL COLLECTED FROM ENDPOINT DEVICES OF A COMPUTER NETWORK (71) Applicant: EMC IP Holding Company LLC, Hopkinton, MA (US)

(72) Inventors: Scott E. Moore, Fredericksburg, VA (US); Scott G. Carter, Denver, CO (US); Matthew Tharp, Denver, CO (US); Edward G. Quackenbush, Oakton, VA (US); Etienne Boucher, Pierrefonds (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 15/281,624

(22) Filed: Sep. 30, 2016

(51) Int. Cl.
*H04L 29/06* (2006.01)
(52) U.S. Cl.
CPC ........ *H04L 63/0428* (2013.01); *H04L 63/065* (2013.01)
(58) Field of Classification Search
CPC .................... H04L 63/0428; H04L 63/065
See application file for complete search history.

(56) References Cited

U.S. PATENT DOCUMENTS

| | | | |
|---|---|---|---|
| 8,116,455 B1 * | 2/2012 | Sussland | G06F 21/575 380/277 |
| 8,813,189 B2 * | 8/2014 | Li | H04L 63/0281 713/155 |
| 8,954,740 B1 * | 2/2015 | Moscaritolo | H04L 63/065 380/277 |
| 9,876,991 B1 * | 1/2018 | Ray | H04N 7/1675 |
| 2003/0018891 A1 | 1/2003 | Hall et al. | |
| 2004/0078568 A1 * | 4/2004 | Pham | G06F 21/6218 713/165 |
| 2005/0050362 A1 | 3/2005 | Peles | |
| 2007/0113078 A1 * | 5/2007 | Witt | G06F 21/602 713/165 |

(Continued)

OTHER PUBLICATIONS wireshark.org, "About Wireshark," https://www.wireshark.org/, Sep. 16, 2016, 5 pages.

(Continued)

*Primary Examiner* — Michael Pyzocha
(74) *Attorney, Agent, or Firm* — Ryan, Mason & Lewis, LLP (57) ABSTRACT

An apparatus in one embodiment comprises a first endpoint device having a processor coupled to a memory. The first endpoint device is adapted for communication with other endpoint devices over a network, and implements a key capture agent configured to interface with an operating system of the first endpoint device. The key capture agent is configured to collect key material associated with a session key utilized to encrypt packets sent by the first endpoint device to a second endpoint device over the network as part of a corresponding session. The key material and an identifier of the corresponding session are transmitted for delivery to a decoder that is not part of the first or second endpoint devices, so as to permit the decoder to be configured to decrypt the encrypted packets in intercepted network traffic. For example, the key capture agent may be configured to transmit the key material.

20 Claims, 6 Drawing Sheets

(56) References Cited

U.S. PATENT DOCUMENTS

| | | | |
|---|---|---|---|
| 2007/0289006 A1* | 12/2007 | Ramachandran | H04L 63/08 |
| | | | 726/10 |
| 2011/0167273 A1* | 7/2011 | Maas | H04L 9/083 |
| | | | 713/171 |
| 2011/0314270 A1 | 12/2011 | Lifliand et al. | |
| 2012/0290829 A1 | 11/2012 | Altman | |
| 2013/0108042 A1* | 5/2013 | Yin | H04N 21/4405 |
| | | | 380/255 |
| 2013/0198512 A1* | 8/2013 | Rubin | H04L 63/0823 |
| | | | 713/157 |
| 2014/0115702 A1* | 4/2014 | Li | G06F 11/30 |
| | | | 726/23 |
| 2015/0113264 A1 | 4/2015 | Wang et al. | |
| 2016/0119374 A1 | 4/2016 | Williams et al. | |

OTHER PUBLICATIONS

RSA, "Detect Unknown Threats. Reduce Dwell Time. Accelerate Response." RSA Netwitness Endpoint, Data Sheet H14904.1, Jun. 2016, 4 pages.

\* cited by examiner

DECRYPTION AND ANALYSIS OF NETWORK TRAFFIC USING KEY MATERIAL COLLECTED FROM ENDPOINT DEVICES OF A COMPUTER NETWORK

FIELD

The field relates generally to computer networks, and more particularly to techniques for processing network traffic in a computer network.

BACKGROUND

Computer networks are often configured to incorporate network security systems in order to protect the networks against malicious activity. Such malicious activity can include, for example, installation of malware intended to create networks of compromised computers or "botnets." Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of network activity. As a result, conventional network traffic analysis techniques and other traditional defenses typically deployed by enterprise network security systems today often fail at detecting and remediating malicious activity at a sufficiently early stage.

SUMMARY

Illustrative embodiments of the invention provide techniques for decryption of network traffic utilizing session keys, session key components or other key material gathered from endpoint devices of a computer network. The decrypted network traffic is analyzed to detect malware or other security threats to the computer network. Such network traffic decryption and analysis arrangements provide significant improvements in detection and remediation of malicious activity relative to conventional approaches.

In one embodiment, an apparatus comprises a first endpoint device having a processor coupled to a memory. The first endpoint device is adapted for communication with other endpoint devices over a network, and implements a key capture agent configured to interface with an operating system of the first endpoint device. The key capture agent is configured to collect key material associated with a session key utilized to encrypt packets sent by the first endpoint device to a second endpoint device over the network as part of a corresponding session. The key material and an identifier of the corresponding session are transmitted for delivery to a decoder that is not part of the first or second endpoint devices, so as to permit the decoder to be configured to decrypt the encrypted packets in intercepted network traffic. For example, the key capture agent may be configured to transmit the key material and identifier to an intermediary key distribution server for delivery to the decoder. As another example, the key capture agent may be configured to transmit the key material and the identifier directly to the decoder without the use of an intermediary key distribution server.

The key material in some embodiments comprises the session key itself. Additionally or alternatively, the key material can comprise a session key component utilized in generating the session key, such as a pre-master secret of the first endpoint device.

The identifier in some embodiments comprises an identifier of the session for which the session key is generated by the first endpoint device. Additionally or alternatively, the identifier can comprise a client random information element of the session, or at least a portion of an encrypted pre-master secret of the first endpoint device.

It is to be appreciated that other types of key material and identifiers can be used in other embodiments.

The key capture agent of the first endpoint device is illustratively configured to select one of a plurality of supported key material collection modes responsive to detection of a particular type of secure connection source for the session.

Additionally or alternatively, the key capture agent is illustratively configured to transmit the key material and identifier in a manner that ensures that the decoder can obtain the associated session key within a specified time window. The specified time window may have a duration of about 60 seconds, although other durations can be used in other embodiments.

In some embodiments, multiple instances of key material are stored by the decoder in association with respective identifiers in a key store. The decoder in such an embodiment is illustratively configured to obtain the intercepted network traffic, to extract an identifier from the intercepted network traffic, to utilize the extracted identifier to determine a corresponding one of the multiple instances of key material in the key store, to obtain the session key based on the determined instance of key material, and to decrypt the encrypted packets of the session using the obtained session key. The decoder may be further configured to perform packet inspection on the decrypted packets utilizing one or more packet parsers, to generate an alert based at least in part on a result of the packet inspection, and to store the encrypted packets in association with metadata comprising the obtained session key.

Illustrative embodiments can advantageously provide early detection and remediation of a malware attack or other type of malicious activity within a computer network. The decoders which receive collected key material and identifiers from key capture agents of respective endpoint devices can be implemented in security appliances or other components of a network security system of an enterprise.

These and other illustrative embodiments include, without limitation, methods, apparatus, systems, computer networks and computer program products comprising processor-readable storage media.

DETAILED DESCRIPTION

Illustrative embodiments of the present invention will be described herein with reference to exemplary computer networks and associated computers, endpoint devices, packet capture systems, servers and other types of processing devices. It is to be appreciated, however, that the invention is not restricted to use with the particular illustrative computer network and processing device configurations shown. Accordingly, the term "computer network" as used herein is intended to be broadly construed, so as to encompass, for example, any system comprising multiple networked processing devices.

Figure 1:
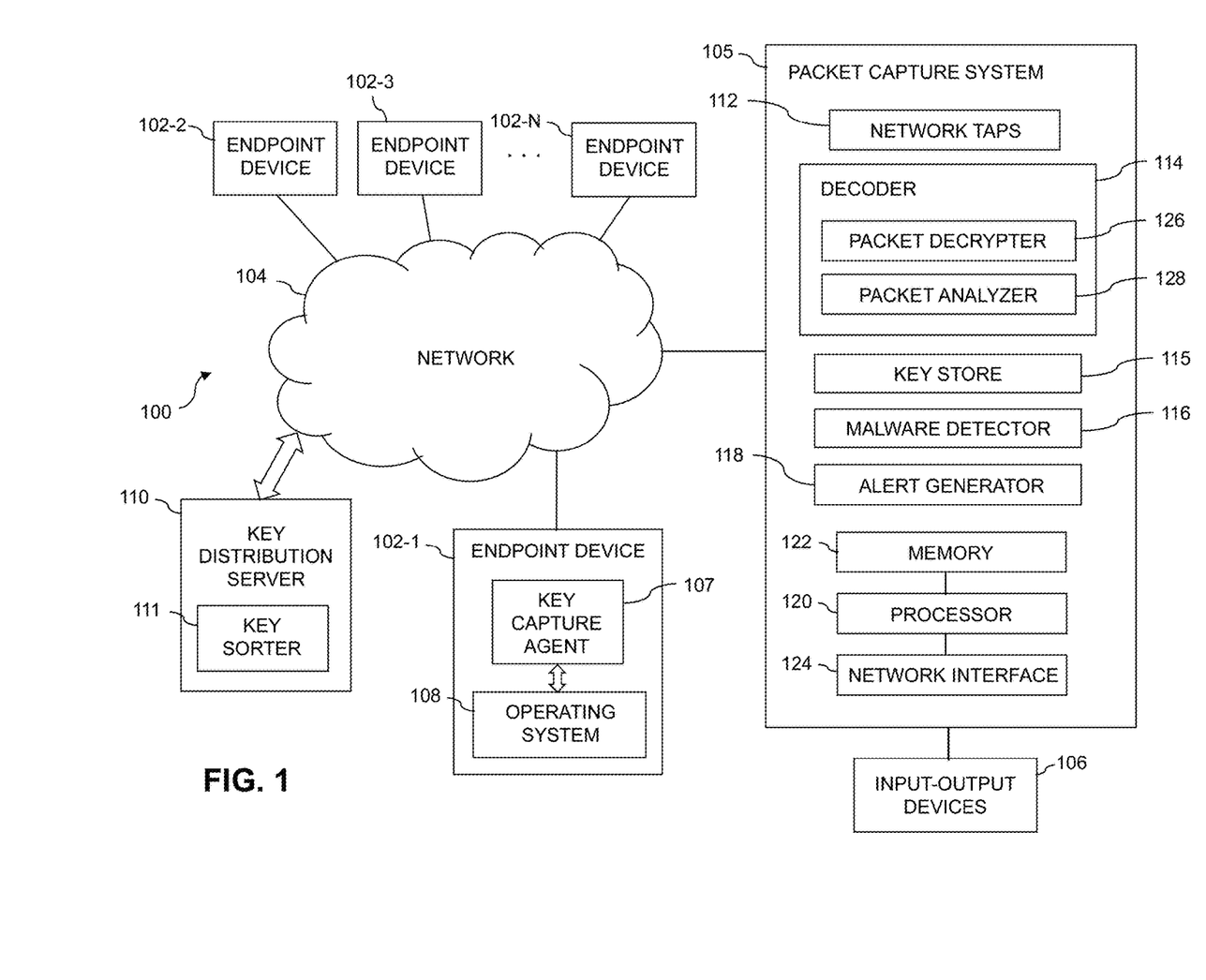
FIG. 1 is a block diagram of a computer network implementing functionality for decryption and analysis of network traffic utilizing key material collected from endpoint devices in an illustrative embodiment.

FIG. 1 shows a computer network 100 configured in accordance with an illustrative embodiment of the invention. The computer network 100 comprises a plurality of endpoint devices 102-1, 102-2, 102-3, . . . 102-N, collectively referred to herein as endpoint devices 102. The endpoint devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a packet capture system 105. The packet capture system 105 is further coupled to input-output devices 106.

The endpoint devices 102 may comprise, for example, mobile telephones, laptop computers, tablet computers, desktop computers or other types of devices capable of supporting user access to network resources. Such devices are examples of what are more generally referred to herein as "processing devices." Some of these processing devices are also generally referred to herein as "computers."

The endpoint devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The endpoint devices 102 are configured to communicate with one another over the network 104. In the present embodiment, at least the endpoint device 102-1 is configured to implement a key capture agent 107 configured to interface with an operating system 108 of the endpoint device 102-1. One or more of the other endpoint devices 102 are also assumed to be configured to implement respective key capture agents configured to interface with their respective operating systems.

The key capture agent 107 is configured to collect key material associated with a session key utilized to encrypt packets sent by endpoint device 102-1, also referred to as a "first endpoint device," to another one of the endpoint devices 102, also referred to as a "second endpoint device." The encrypted packets are sent over the network 104 as part of a corresponding session between the first and second endpoint devices.

The computer network 100 further comprises a key distribution server 110 coupled to the network 104 as shown. The key distribution server 110 comprises a key sorter 111 and may incorporate additional or alternative functionality relating to distribution of keys or other key material and associated identifiers.

For example, in some embodiments, the key material collected by the key capture agent 107 and an identifier of the corresponding session are transmitted from the first endpoint device 102-1 over the network 104 to the key distribution server 110. The key distribution server 110 can similarly receive collected key material and identifiers of respective corresponding sessions from key capture agents implemented on other ones of the endpoint devices 102. The key sorter 111 is illustratively configured to sort the received key material in order to facilitate its delivery to other network entities as will be described below.

Illustrative examples of key distribution servers that can be used in some embodiments include servers implementing at least a portion of the functionality of an Enterprise Compromise Assessment Tool (ECAT), commercially available from RSA, The Security Division of EMC Corporation of Hopkinton, Mass. The key capture agents in some embodiments can be implemented using ECAT agents suitably modified to collect key material in the manner disclosed herein.

The packet capture system 105 in the present embodiment illustratively comprises network taps 112 for intercepting network traffic directed between particular ones of the endpoint devices 102. The intercepted network traffic from the network taps 112 is provided to a decoder 114 of the packet capture system 105 that operates in conjunction with additional elements including key store 115, malware detector 116 and alert generator 118.

The key material collected by the key capture agent 107 and an identifier of the corresponding session are transmitted for delivery to the decoder 114. The decoder 114 is not part of the first or second endpoint devices but is instead implemented in the packet capture system 105, which is illustratively part of a separate stand-alone device or system such as a network security appliance or a network security system. The key material and the identifier of the corresponding session permit the decoder 114 to be configured to decrypt the encrypted packets in the intercepted network traffic.

As noted above, the key capture agent 107 in some embodiments is configured to transmit the key material and the identifier to the key distribution server 110, which serves as an intermediary device for delivery of the key material and the identifier to the decoder 114. Alternatively, the key capture agent 107 can be configured to transmit the key material and the identifier directly to the decoder 114 of the packet capture system 105 without the use of an intermediary such as the key distribution server 110. Other types of transmission of the key material and identifier can be used.

The key material in some embodiments comprises the session key utilized to encrypt the packets sent between the first and second endpoint devices 102 as part of the corresponding session.

In such an arrangement, the key material collected by the key capture agent 107 may comprise a plurality session keys associated with respective sessions between the first endpoint device 102-1 and respective other ones of the endpoint devices 102.

The key capture agent 107 in this type of arrangement can be configured to group multiple ones of the session keys together for batch transmission over an HTTPS connection or other TCP connection to the key distribution server 110 or directly to the decoder 114.

Alternatively, the key capture agent 107 can be configured to transmit respective ones of the session keys individually to the key distribution server 110 or decoder 114 as those session keys are collected. A lightweight protocol based on shared secret encryption may be utilized for transmission of each of the session keys as they are collected.

Additionally or alternatively, the key material may comprise a session key component utilized in generating the session key for the session. For example, such a session key component may comprise a pre-master secret of the first endpoint device 102-1. As another example, the key material collected by the key capture agent 107 of the first endpoint device 102-1 in some embodiments comprises one or more Transport Layer Security (TLS) encryption keys of the first endpoint device 102-1. Other types of key material can be used in other embodiments. For example, in some embodiments, the key material can comprise at least a portion of a private key of the endpoint device. Accordingly, terms such as "key" and "key material" as used herein are intended to be broadly construed.

The identifier in some embodiments comprises an identifier of the session for which the session key is generated by the first endpoint device 102-1. Additionally or alternatively, the identifier may comprise a client random information element of the session, or at least a portion of an encrypted pre-master secret of the first endpoint device 102-1. Other types of identifiers can be used in other embodiments, and the term "identifier" as used herein is therefore intended to be broadly construed.

The key capture agent 107 is illustratively implemented at least in part as endpoint device software comprising at least one of a user-mode component and a kernel-mode component utilized to collect the key material.

The key capture agent 107 in some embodiments is configured to support multiple distinct key material collection modes of operation, and to select a particular one of the supported key material collection modes responsive to detection of a particular type of secure connection source for the session.

By way of example, a given one of the key material collection modes illustratively comprises a key material collection mode that utilizes an application programming interface (API) configured to export at least a portion of the key material. A key material collection mode of this type can be used for an application or other TLS connection source that explicitly provides an API to export TLS encryption keys.

Another example of a key material collection mode is one that utilizes a specified file-based API providing access to at least a portion of the key material. The specified file-based API may be configured by at least one of setting an environmental variable to a particular file path and modifying a configuration file. More particularly, certain web browsers (e.g., Chrome and Firefox) and other applications based on the Network Security Services (NSS) library offer a specific file-based API to access TLS encryption keys. This is typically done by setting an environment variable %SSLKEYLOGFILE% to a file path, or by modifying a configuration file. In order to avoid leaving this sensitive information unprotected, the output path could also be set to a custom virtual file or device.

Other examples of key material collection modes include a mode that intercepts at least a portion of the key material utilizing one or more internal encryption libraries of the operating system 108 of the first endpoint device 102-1, and a mode that intercepts at least a portion of the key material utilizing memory scanning and pattern matching performed on the first endpoint device 102-1.

As a more particular example of the former type of arrangement, there is a wide range of Windows applications which use Windows APIs to establish TLS connections. For such applications, key extraction can be performed using user-mode hooking techniques. The Windows APIs used to establish TLS connections rely on a small number of internal encryption libraries, and the TLS encryption keys can be intercepted from underlying encryption processes. Other similar hooking techniques can be utilized for other types of encryption libraries, including TLS libraries such as OpenSSL.

The key capture agent 107 is illustratively configured to switch between two or more of these or other key material collection modes of operation responsive to particular detected conditions, such as the above-noted detection of a particular type of secure connection source for the session. The particular key material collection modes mentioned above are examples only, and should not be viewed as limiting in any way.

The key capture agent 107 in the present embodiment is configured to transmit the key material and identifier in a manner that ensures that the decoder can obtain the associated session key within a specified time window. The specified time window may have a duration of about 60 seconds, although other durations can be used in other embodiments.

Multiple instances of the key material received by the decoder 114 are stored in the key store 115 in association with respective identifiers. Such multiple instances of the key material may be received from different key capture agents implemented on respective different ones of the endpoint devices 102.

In such an arrangement, the decoder 114 obtains intercepted network traffic from the network taps 112, extracts an identifier from the intercepted network traffic, utilizes the extracted identifier to determine a corresponding one of the multiple instances of key material in the key store 115, obtains the session key based on the determined instance of key material, and decrypts the encrypted packets of the session using the obtained session key.

The decoder 114 can then apply various types of analysis to the decrypted packets. For example, it can perform packet inspection on the decrypted packets utilizing one or more packet parsers, and can generate an alert based at least in part on a result of the packet inspection, as will be described in more detail below. It is also assumed that the decoder 114 stores the encrypted packets in association with metadata comprising the obtained session key, for use in subsequent additional analysis as needed.

The packet capture system 105 in the FIG. 1 embodiment is assumed to be implemented using at least one processing device. Each such processing device generally comprises at least one processor and an associated memory, and implements one or more functional modules for controlling certain features of the packet capture system 105.

More particularly, the packet capture system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the packet capture system 105 to communicate over the network 104 with the endpoint devices 102 and the key distribution server 110, and illustratively comprises one or more conventional transceivers.

The processor 120 and memory 122 are illustratively configured to implement at least portions of the decoder 114, key store 115, malware detector 116 and alert generator 118.

For example, particular modules of the decoder 114, such as packet decrypter 126 and packet analyzer 128, can be implemented at least in part in the form of software that is stored in memory 122 and executed by processor 120. The packet decrypter 126 is configured to obtain a session key for intercepted network traffic in the manner previously described, and to decrypt the encrypted packets of a corresponding session. The packet analyzer 128 illustratively includes multiple packet parsers for performing deep packet inspection and other analytic operations on the decrypted packets.

A given one of the packet parsers can comprise a parser that provides information to the malware detector 116. Such information is utilized to detect the presence of malware based on the analysis of the intercepted network traffic. Detection of malware can cause the alert generator 118 to generate an alarm or other type of alert within the computer network 100. Such an alert is illustratively transmitted by the packet capture system 105 via network interface 124 over network 104 to one or more security agents of a network security system. Examples of security agents utilizable in a given embodiment include agents configured with the above-noted ECAT functionality.

It should be noted that a "security agent" as the term is generally used herein may comprise, for example, an automated entity, such as a hardware, software or firmware entity running on a processing device. Accordingly, like the above-noted "user," a security agent may but need not comprise a human entity.

In some embodiments, alerts generated by the packet capture system 105 are provided over the network 104 to one or more security agent devices. Such devices, like the endpoint devices 102, can illustratively comprise mobile telephones, laptop computers, tablet computers, desktop computers, or other types of computers or processing devices configured for communication over network 104 with the packet capture system 105. For example, a given security agent device can comprise a mobile telephone equipped with a mobile application configured to receive alerts from the packet capture system 105 and to provide an interface for a security agent to select particular remedial measures for responding to the alert.

The packet capture system 105 or other computer network elements may be configured to take one or more remedial actions responsive to generation of the alert by the alert generator 118. Examples of such remedial measures may include turning off, disconnecting or otherwise disabling or quarantining one or more of the endpoint devices 102 that are determined to be likely to be infected with malware.

It is to be appreciated that this particular arrangement of modules and other elements 112, 114, 116 and 118 illustrated in the packet capture system 105 of the FIG. 1 embodiment is presented by way of example only, and alternative arrangements can be used in other embodiments. Moreover, the particular set of computer network elements shown in the embodiment of FIG. 1 for decrypting and analyzing network traffic is presented by way of illustrative example only, and in other embodiments additional or alternative computer network elements may be used. Thus, another embodiment may include additional or alternative systems, devices and other network entities, as well as different arrangements of modules and other elements.

By way of example, in other embodiments, the packet capture system 105 can be implemented in a distributed manner, with particular modules or other elements thereof being distributed over multiple processing devices of the computer network 100.

Other elements of the computer network 100, including each of the endpoint devices 102 and the key distribution server 110, are assumed to include processor, memory and network interface elements similar to those described above in the context of the packet capture system 105.

In some embodiments, the packet capture system 105 is a part of or otherwise associated with another system, such as, for example, a security operations center (SOC) or a critical incident response center (CIRC).

Additionally or alternatively, the packet capture system 105 can be part of or incorporate an otherwise conventional security analytics system, such as the RSA Security Analytics system commercially available from RSA, The Security Division of EMC Corporation of Hopkinton, Mass.

Other embodiments can implement the packet capture system 105 as part of or in conjunction with a security information and event management (STEM) system, such as an enVision® platform, also commercially available from RSA. Such an STEM system is also considered another possible example of a "network security system" as that term is broadly used herein.

The packet capture system 105 is assumed to comprise or otherwise be associated with at least one storage device suitable for implementing at least portions of the key store 115 as well as storage for intercepted network traffic and storage for encrypted packets in association with corresponding session keys.

The storage device can be part of one or more storage systems associated with the packet capture system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment.

The storage device can illustratively comprise a single storage array, storage disk, storage drive or other type of storage device within the computer network 100. Alternatively, the storage device can comprise one or more storage systems each having multiple storage devices implemented therein. The term "storage device" as used herein is therefore intended to be broadly construed.

In some embodiments, the packet capture system 105 is co-located with the storage device, for example, within a particular data center or other facility of a given enterprise. Alternatively, the packet capture system 105 may be implemented in cloud infrastructure that is remote from the storage device.

The input-output devices 106 coupled to the packet capture system 105 illustratively comprise keyboards, displays or other types of input-output devices in any combination. Such input-output devices are used to support one or more user interfaces to the packet capture system 105, as well as to support communication between the packet capture system 105 and other related systems and devices not explicitly shown.

An exemplary process for decryption and analysis of network traffic utilizing key material collected from endpoint devices will now be described in more detail with reference to the flow diagram of FIG. 2. The process can be implemented in computer network 100 but is more generally applicable to other types of computer networks. It is to be understood that this particular process is only an example, and additional or alternative processes can be carried out in other embodiments.

In step 200, a key capture agent is implemented. The key capture agent is configured to interface with an operating system of a first endpoint device. For example, in the computer network 100, key capture agent 107 is implemented at least in part as endpoint device software configured to interface with operating system 108 of first endpoint device 102-1. Numerous other types of key capture agents implemented using hardware, software or firmware or various combinations thereof can be utilized in other embodiments.

In step 202, the key capture agent collects key material associated with a session key utilized to encrypt packets sent by the first endpoint device to a second endpoint device over a network in a corresponding session. As mentioned previously, the key material can comprise the session key itself, or one or more components used to generate the session key, such as a pre-master secret of the first endpoint device. Other types of key material can additionally or alternatively be collected by the key capture agent in this step.

In step 204, the key material and an identifier of the corresponding session are transmitted to a decoder that is not part of the first and second endpoint devices so as to permit the decoder to be configured to decrypt the encrypted packets in intercepted network traffic. For example, in the computer network 100, key material and an identifier of the corresponding session can be transmitted from the key capture agent 107 of the first endpoint device 102-1 to the decoder 114 via the key distribution server 110, or directly from the key capture agent 107 of the first endpoint device 102-1 to the decoder 114 without the use of the key distribution server 110. Other types of transmission of the key material and identifier can be used in other embodiments. Such transmission can involve additional or alternative elements of the endpoint device other than the key capture agent, including a network interface of the endpoint device. It is assumed for purposes of step 204 that the decoder utilizes the key material and identifier to obtain a session key suitable for decrypting the encrypted packets in the intercepted network traffic. With reference again to the computer network 100, the intercepted network traffic is provided to the decoder from the network taps 112.

In step 206, deep packet inspection of the decrypted packets is performed in the decoder using one or more parsers. Examples of such parsing will be described in more detail below in conjunction with the embodiment of FIGS. 4 through 6.

In step 208, an alert is generated based at least in part on a result of the packet inspection. Such an alert may be transmitted over the network to one or more security agent devices. In place of or in addition to transmission of an alert to a security agent device, automated processing may be applied to an alert in at least one processing device of an SOC, CIRC, SIEM system, or other type of network security system. Alerts can therefore be used to trigger actions such as generation of a security ticket or transmission to an incident response team or associated console or application. Additionally or alternatively, an alert can be used to automatically trigger one or more remedial actions within the computer network. Such automated remedial actions can illustratively include, for example, quarantining one or more of the endpoint devices that are suspected as being infected with malware or otherwise associated with malicious activity within the computer network.

In step 210, encrypted packets are stored in association with metadata comprising the session key. Such an arrangement ensures that the decrypted packets are not maintained by the decoder or an associated storage device in unencrypted form. Instead, the encrypted packets of a given session as captured by the network taps 112 are stored in association with the corresponding session key so as to permit security personnel with appropriate credentials to perform subsequent additional decryption and analysis as needed.

The process then returns to step 202 to collect additional key material for respective additional sessions involving the first endpoint device.

Figure 2:
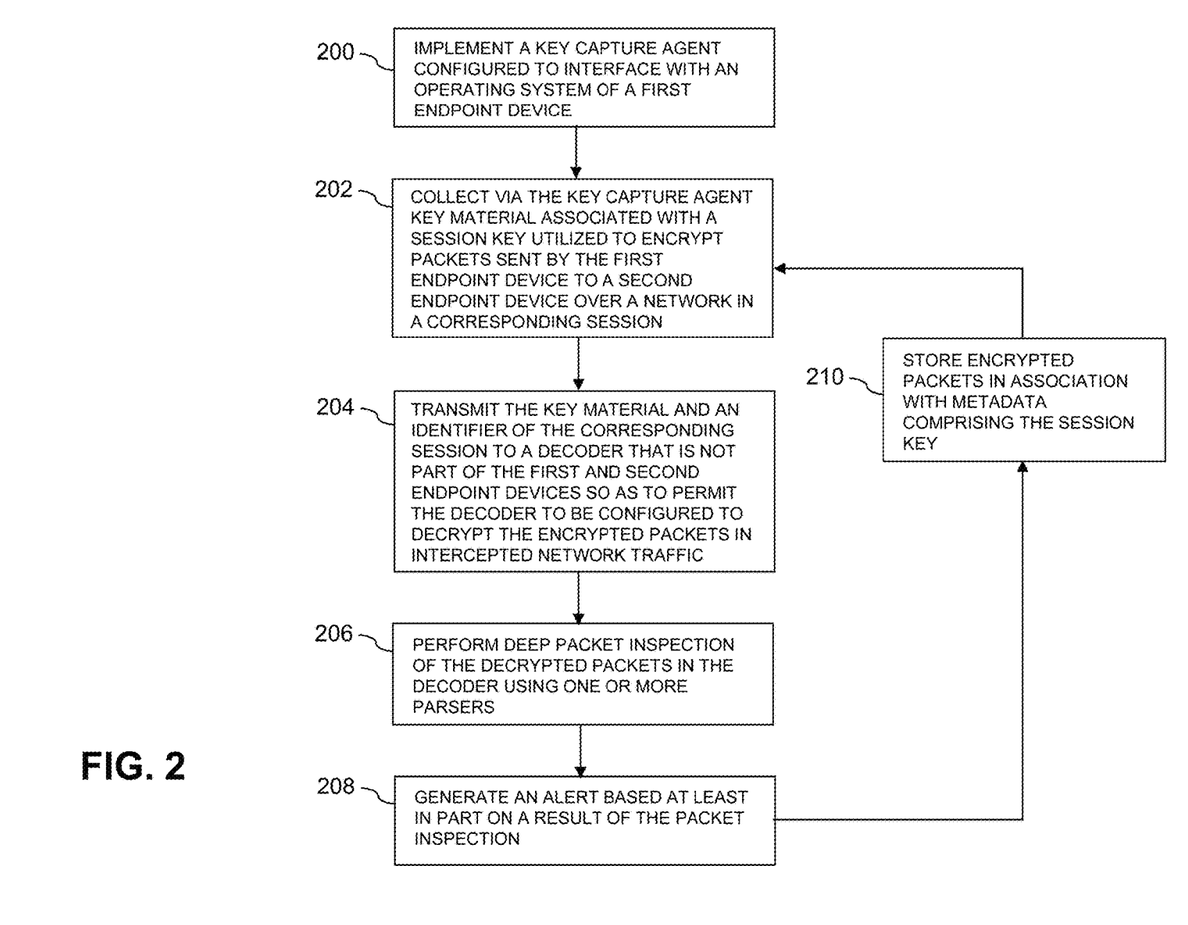
FIG. 2 is a flow diagram of a process for decryption and analysis of network traffic utilizing key material collected from endpoint devices in an illustrative embodiment.

It should be understood that additional instances of steps 200 through 210 of the FIG. 2 process can be performed for different sessions involving different endpoint devices of a computer network, or may otherwise be repeated periodically in order to ensure that malware attacks and other types of malicious activity are accurately and efficiently detected and remediated within the computer network.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to decrypt and analyze network traffic and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of network traffic detection and analysis for different endpoint devices.

Additional illustrative embodiments will now be described with reference to FIGS. 3 through 6.

Figure 3:
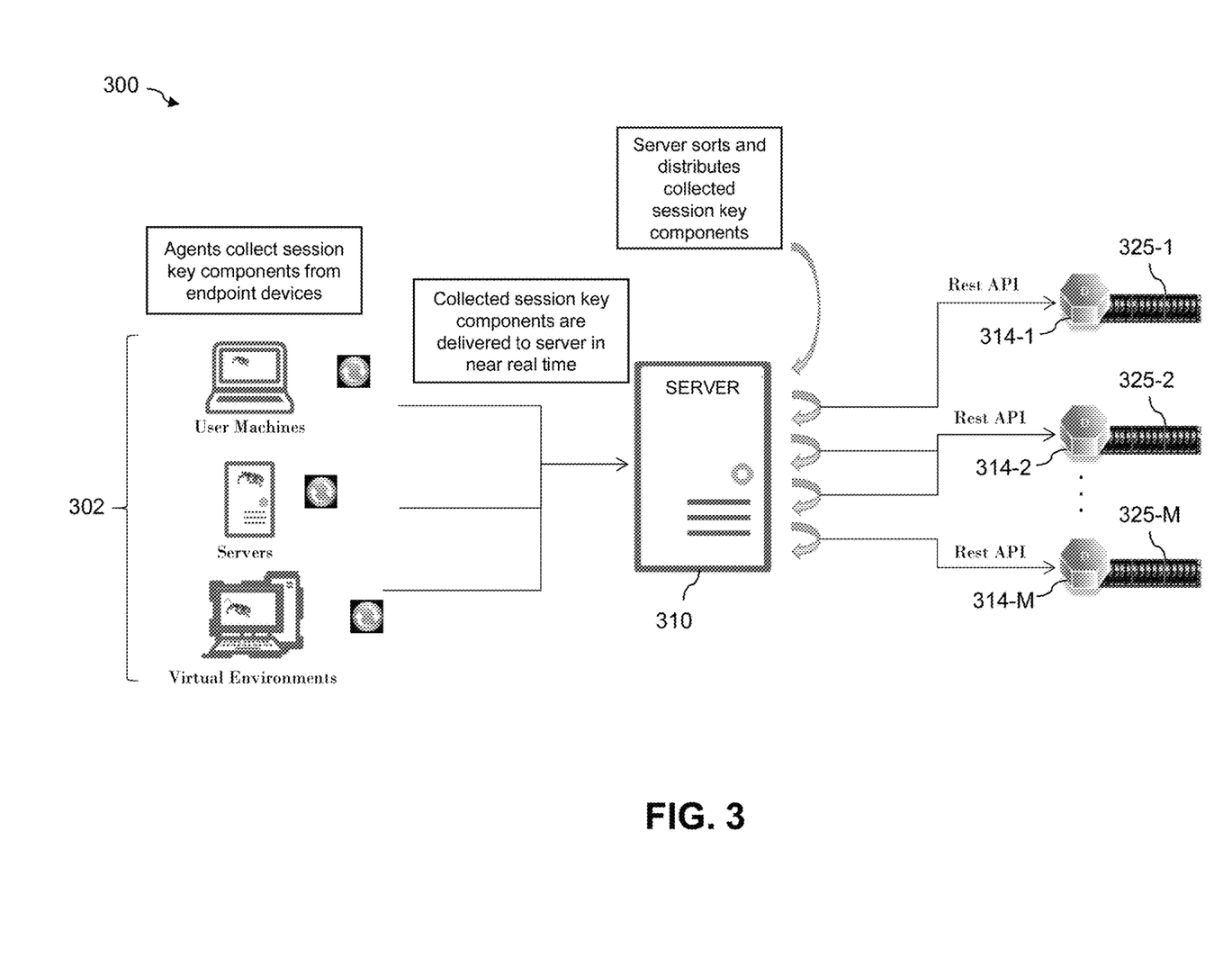
FIG. 3 illustrates distribution of key material collected from endpoint devices through an intermediary server in another embodiment.

Referring initially to FIG. 3, a computer network 300 comprises a plurality of endpoint devices 302, an intermediary server 310 and a plurality of decoders 314-1, 314-2, . . . 314-M. The endpoint devices 302 in this embodiment include user machines, servers and virtual environments.

Each such endpoint is assumed to implement a corresponding key capture agent of the type described previously. The key capture agent of a given endpoint device is illustratively implemented as endpoint device software that interfaces with an operating system of that endpoint device.

Such key capture agents in this embodiment collect session key components from their respective endpoint devices 302. It is assumed that the session key components collected by the key capture agents comprise pre-master secrets of the respective endpoint devices. These pre-master secrets are considered a type of "key" as that term is broadly used herein. The pre-master secrets are utilized by the respective endpoint devices 302 to generate session keys on the respective endpoint devices for encrypting packets of sessions between those devices and other endpoint devices.

The collected session key components are delivered with their respective identifiers to the intermediary server 310 in near real time. The intermediary server 310 may comprise an ECAT server suitably modified to implement key distribution as disclosed herein. The intermediary server 310 may be viewed as an example of what is also referred to herein as a key distribution server, similar to the key distribution server 110 of the FIG. 1 embodiment.

The intermediary server 310 in this embodiment sorts the session key components and their respective identifiers and distributes those items to the decoders 314 via representational state transfer (REST) APIs as shown. For example, different ones of the decoders 314 may receive session key components and identifiers for different subsets of the endpoint devices 302 under the control of the intermediary server 310. The individual decoders 314-1, 314-2, . . . 314-M are assumed to include respective packet buffers 325-1, 325-2, . . . 325-M which store encrypted packets of a session for decryption within the decoder.

A given one of the decoders 314 utilizes the session key component and identifier for a given session as received from the intermediary server 310 via the REST API in order to generate or otherwise obtain a session key that it utilizes to decrypt the encrypted packets for analysis. The given decoder is assumed to obtain the encrypted packets from a network tap that is not explicitly shown in the figure.

Figure 4:
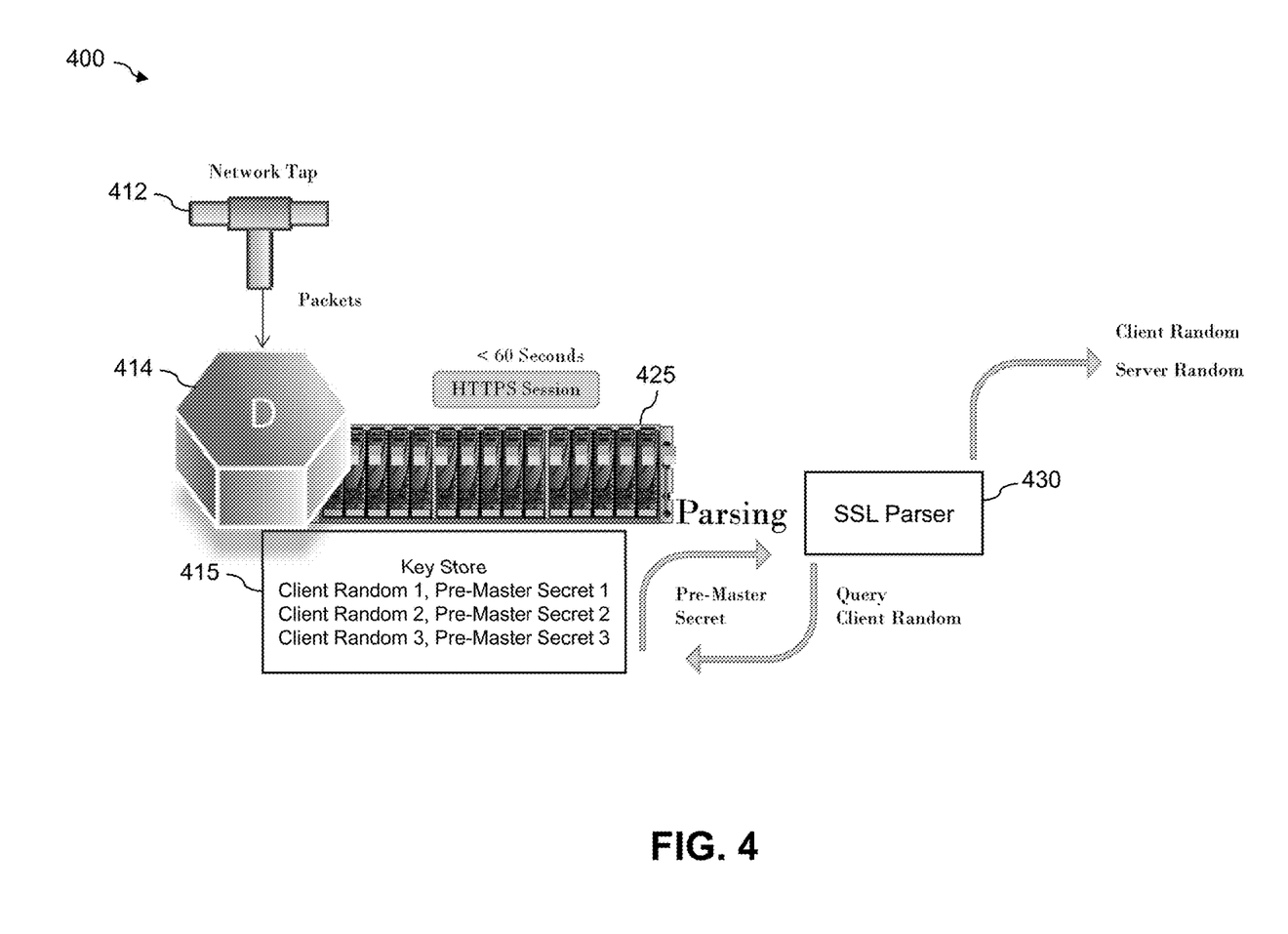
FIGS. 4, 5 and 6 illustrate different aspects of decryption and analysis of network traffic in another embodiment.
Figure 5:
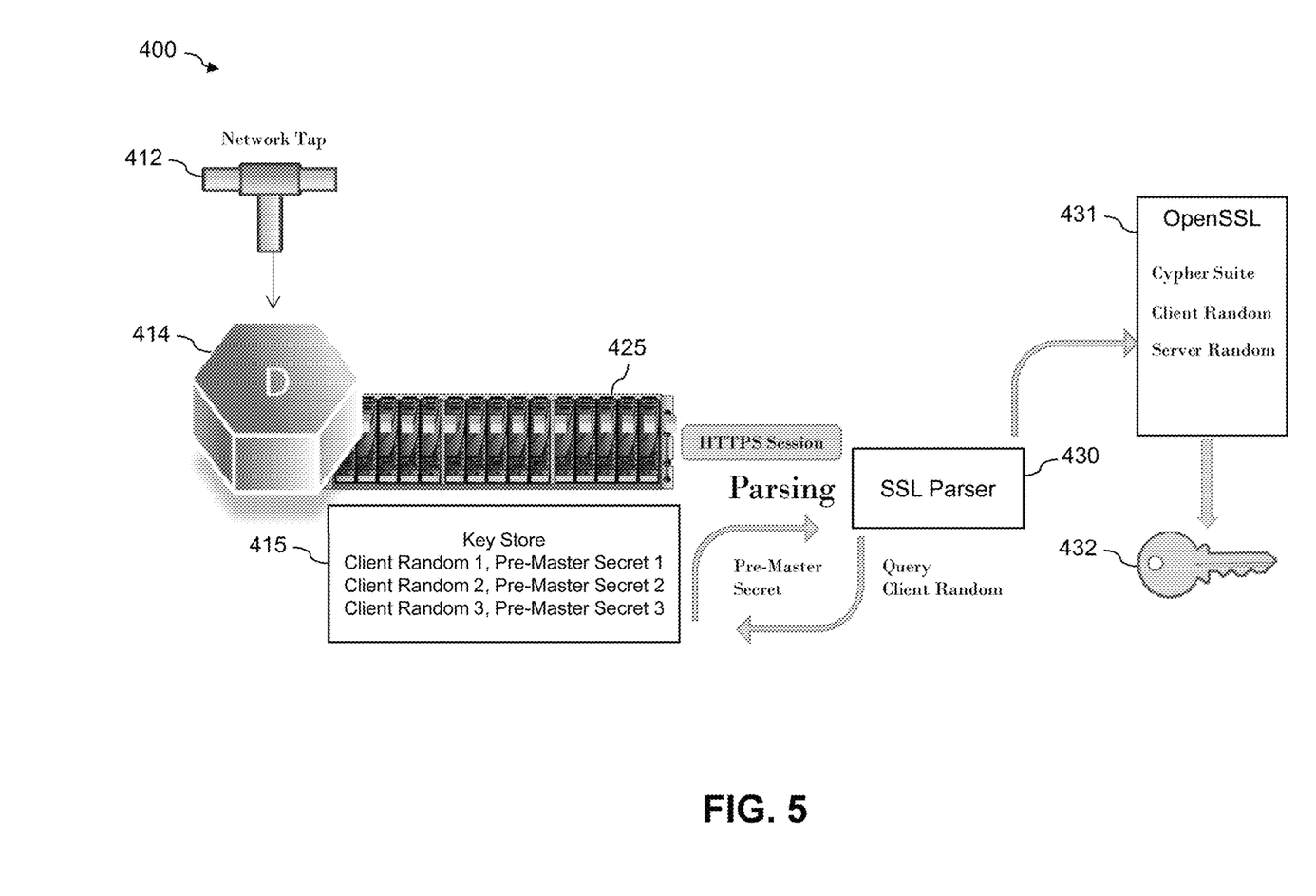
Figure 6:
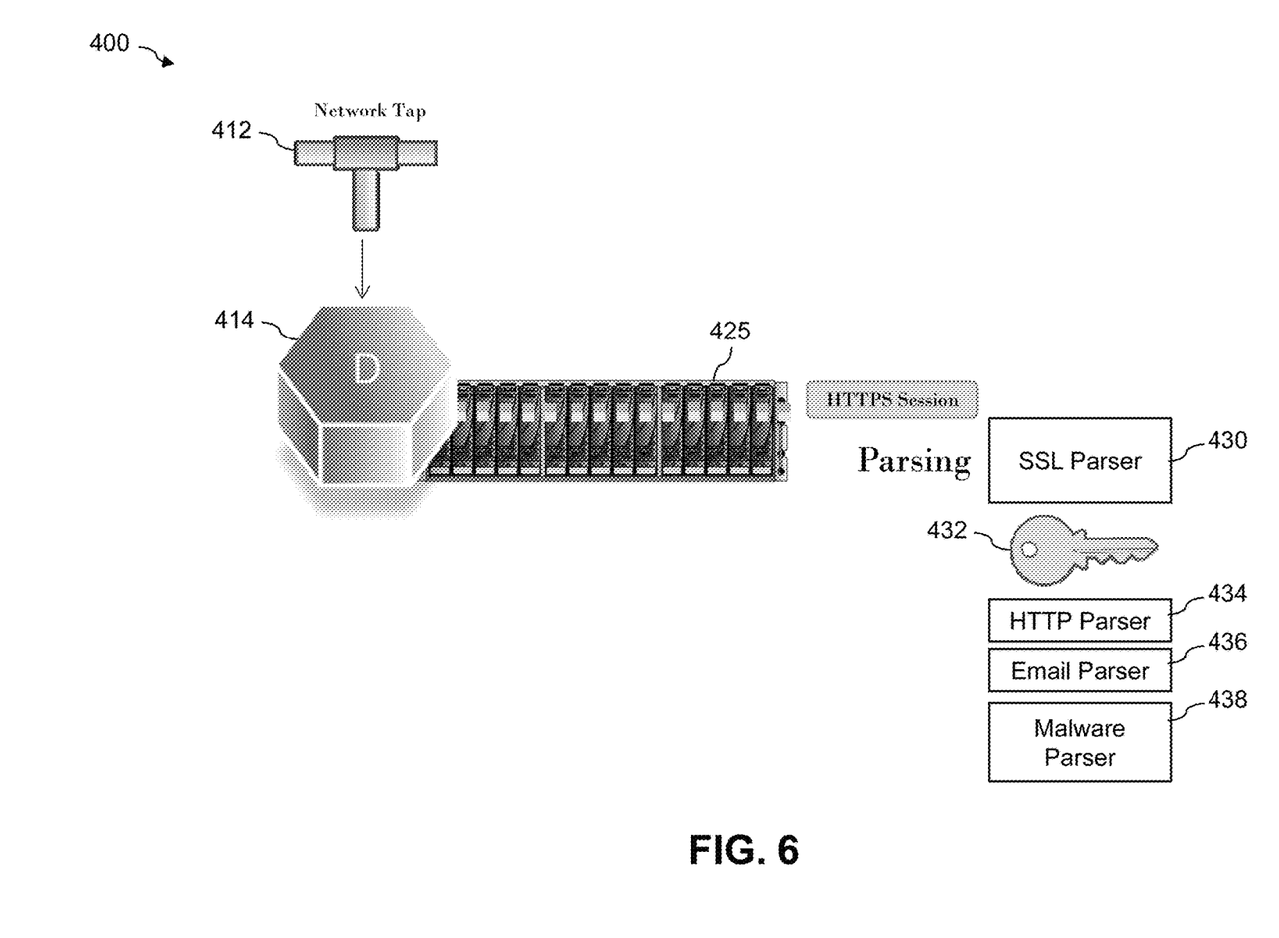

FIGS. 4, 5 and 6 illustrate different aspects of decryption and analysis of network traffic in another embodiment. In this embodiment, a computer network 400 as shown in FIG. 4 comprises a network tap 412. The network tap 412 intercepts network traffic and provides encrypted packets of the intercepted network traffic to a decoder 414 having an associated key store 415. The decoder 414 includes an associated packet buffer 425 for buffering encrypted packets of an HTTPS session involving a particular pair of target endpoint devices. The decoder 414 of FIG. 4 may correspond, for example, to decoder 114 of the FIG. 1 embodiment or a particular one of the decoders 314 of the FIG. 3 embodiment.

In operation, encrypted packets are associated with a network session and a corresponding application protocol is determined. Examples of possible application protocols include HTTP, TLS, IMAP, POP3, etc. The encrypted packets are buffered in the packet buffer 425 and there is a small delay before packet decryption begins. This allows sufficient time for a key capture agent on an endpoint device to collect the key material and transmit the key material with the identifier for delivery to the decoder 414.

The key store 415 stores collected key material comprising pre-master secrets for respective endpoint devices. The pre-master secrets are stored in association with respective identifiers of corresponding sessions. In this embodiment, the key identifiers comprise respective client random information elements, also referred to as respective instances of "client random" information. Accordingly, the key store 415 is illustratively shown as storing instances of client random information denoted Client Random 1, Client Random 2 and Client Random 3 in association with respective pre-master secrets denoted Pre-Master Secret 1, Pre-Master Secret 2 and Pre-Master Secret 3.

The key store 415 may utilize hash containers for efficient lookup of a given pre-master secret given its corresponding client random information. In addition, a timestamp may be associated with each such encryption key pair for aging out purposes. As memory is assumed to be a finite resource, encryption key pairs have a limited lifetime and should be deleted at regular intervals to prevent resource exhaustion.

An SSL parser 430 of the computer network 400 is configured to obtain the client random information for the session for which packets are to be decrypted, and to query the key store 415 using that particular client random information in order to obtain the corresponding pre-master secret as illustrated in FIG. 4. It is assumed that the SSL parser 430 has access to both client random and server random information for the corresponding session. In addition, it is assumed that the decoder 414 receives the key material comprising the pre-master secret and the identifier comprising the corresponding client random information for the session within a specified time window of 60 seconds. The key material and identifier are typically received much more quickly, for example, in a few seconds. The packet buffer 425 in this embodiment stores about 60 seconds of encrypted packets for the session.

The network tap 412, decoder 414, key store 415, packet buffer 425 and SSL parser 430 may be part of a packet capture system such as packet capture system 105 described in conjunction with the FIG. 1 embodiment.

FIG. 5 illustrates the generation of the session key for the decoder 414. The SSL parser 430 provides the pre-master secret obtained from the key store 415 to an OpenSSL component 431 that implements a Cypher Suite. The Cypher Suite of the OpenSSL component 431 combines the pre-master secret with the client random and server random information in order to generate a session key 432.

As shown in FIG. 6, the SSL parser 430 utilizes the generated session key 432 to decrypt the buffered packets into a separate decrypted packet buffer that is not explicitly shown. The decrypted packets are then subject to deep packet inspection utilizing a plurality of parsers including an HTTP parser 434, an email parser 436 and a malware parser 438. These and other parsers that may be utilized to analyze the decrypted packets illustratively include native parsers written in C++, FlexParsers utilizing an XML-based parsing language from NetWitness, and Lua parsers written in the Lua language. By performing deep packet inspection on the decrypted packets, the FIG. 6 arrangement can access data in the application protocol that would otherwise be hidden from view.

The original encrypted packets in the present embodiment are assumed to be written to a disk or other storage device accessible to the decoder 414 of the computer network 400, with the corresponding session key being stored as associated metadata. This ensures that the encrypted packets remain forensically valid and available to authorized personnel for subsequent analysis as needed.

The above-described illustrative embodiments provide significant advantages relative to conventional approaches.

For example, some illustrative embodiments can advantageously provide early detection and remediation of a malware attack or other type of malicious activity within a given computer network.

In addition, session keys, session key components or other key material are gathered in a particularly efficient and expeditious manner using a key capture agent that can be implemented at least in part as software running on an endpoint device and interfacing with an operating system of the endpoint device.

Such an arrangement allows the key material and an identifier of the corresponding session to be made available to a decoder that can obtain intercepted network traffic of the session from one or more network taps and can decrypt and analyze the encrypted packets within the intercepted network traffic.

Moreover, deep packet inspection illustratively utilizing multiple distinct packet parsers can be performed on the decrypted packets.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, storage devices, security appliances and other types of processing devices.

The processing devices and other computer network components referred to herein can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of endpoint device software, key capture agents, packet capture systems, decoders and other components can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. An apparatus comprising:
a first endpoint device; and
a server;
each of the first endpoint device and the server comprising a processor coupled to a memory;
the first endpoint device being adapted for communication with the server and at least a second endpoint device over a network;
the first endpoint device implementing a key capture agent configured to interface with an operating system of the first endpoint device;
the key capture agent being configured to collect key material associated with a session key utilized to encrypt packets sent by the first endpoint device to the second endpoint device over the network as part of a corresponding session;
wherein the key material and an identifier of the corresponding session are transmitted by the first endpoint device to the server for delivery to a first decoder that is not part of the first or second endpoint devices so as to permit the first decoder to be configured to decrypt the encrypted packets in intercepted network traffic; and
wherein the server is configured:
to receive the key material and the identifier of the corresponding session from the first endpoint device;
to receive additional key material and associated session identifiers from one or more additional endpoint devices;
to sort the received key material from the first endpoint device and the one or more additional endpoint devices; and
to distribute different portions of the sorted key material to respective different ones of a plurality of decoders including the first decoder.

2. The apparatus of claim 1 wherein the key material comprises at least one of:
the session key itself; and
a session key component utilized in generating the session key for the session.

3. The apparatus of claim 2 wherein the session key component comprises a pre-master secret of the first endpoint device.

4. The apparatus of claim 1 wherein the identifier comprises at least one of:
an identifier of the session for which the session key is generated by the first endpoint device;
a client random information element of the session; and
at least a portion of an encrypted pre-master secret of the first endpoint device.

5. The apparatus of claim 1 wherein the key capture agent is configured to transmit the key material and the identifier to the server for delivery to the first decoder.

6. The apparatus of claim 1 wherein the key material collected by the key capture agent of the first endpoint device comprises one or more Transport Layer Security (TLS) encryption keys of the first endpoint device.

7. The apparatus of claim 1 wherein the key capture agent is implemented at least in part as endpoint device software comprising at least one of a user-mode component and a kernel-mode component utilized to collect the key material.

8. The apparatus of claim 1 wherein the key capture agent is configured to select one of a plurality of supported key material collection modes responsive to detection of a particular type of secure connection source for the session.

9. The apparatus of claim 8 wherein the key material collection modes comprise one or more of the following:
a key material collection mode that utilizes an application programming interface (API) configured to export at least a portion of the key material;
a key material collection mode that utilizes a specified file-based API providing access to at least a portion of the key material wherein the specified file-based API is configured by at least one of setting an environmental variable to a particular file path and modifying a configuration file;
a key material collection mode that intercepts at least a portion of the key material utilizing one or more internal encryption libraries of the operating system; and
a key material collection mode that intercepts at least a portion of the key material utilizing memory scanning and pattern matching performed on the first endpoint device.

10. The apparatus of claim 1 wherein the key material collected by the key capture agent comprises a plurality session keys associated with respective sessions and wherein the key capture agent is configured to group multiple ones of the session keys together for batch transmission over an HTTPS connection.

11. The apparatus of claim 1 wherein the key material collected by the key capture agent comprises a plurality session keys associated with respective sessions and wherein the key capture agent is configured to transmit respective ones of the session keys individually as those session keys are collected and wherein shared secret encryption is utilized for transmission of each of the session keys.

12. The apparatus of claim 1 wherein the key capture agent is configured to transmit the key material and identifier to the server in a manner that ensures that the first decoder can obtain the associated session key within a specified time window.

13. The apparatus of claim 1 wherein multiple instances of key material are stored by the first decoder in association with respective identifiers in a key store, and wherein the first decoder is configured:
to obtain the intercepted network traffic;
to extract an identifier from the intercepted network traffic;
to utilize the extracted identifier to determine a corresponding one of the multiple instances of key material in the key store;
to obtain the session key based on the determined instance of key material;
to decrypt the encrypted packets of the session using the obtained session key;
to perform packet inspection on the decrypted packets utilizing one or more packet parsers;
to generate an alert based at least in part on a result of the packet inspection; and
to store the encrypted packets in association with metadata comprising the obtained session key.

14. The apparatus of claim 1 wherein the server is further configured to distribute the different portions of the sorted key material to respective different ones of the plurality of decoders via respective via representational state transfer (REST) application programming interfaces (APIs).

15. A method comprising:
configuring a first endpoint device to communicate with a server and at least a second endpoint device over a network;

implementing in the first endpoint device a key capture agent configured to interface with an operating system of the first endpoint device;

collecting, via the key capture agent, key material associated with a session key utilized to encrypt packets sent by the first endpoint device to the second endpoint device over the network as part of a corresponding session;

transmitting the key material and an identifier of the corresponding session from the first endpoint device to the server for delivery to a first decoder that is not part of the first or second endpoint devices so as to permit the first decoder to be configured to decrypt the encrypted packets in intercepted network traffic;

receiving in the server the key material and the identifier of the corresponding session from the first endpoint device;

receiving in the server additional key material and associated session identifiers from one or more additional endpoint devices;

sorting in the server the received key material from the first endpoint device and the one or more additional endpoint devices; and distributing from the server different portions of the sorted key material to respective different ones of a plurality of decoders including the first decoder.

16. The method of claim 15 wherein the key capture agent is configured to select one of a plurality of supported key material collection modes responsive to detection of a particular type of secure connection source for the session.

17. The method of claim 15 wherein transmitting the key material and identifier for delivery to the first decoder comprises transmitting the key material and identifier in a manner that ensures that the first decoder can obtain the associated session key within a specified time window.

18. A computer program product comprising a non-transitory processor-readable storage medium having stored therein program code of one or more software programs, wherein the program code when executed causes the following operations to be performed:

to configure a first endpoint device to communicate with a server and at least a second endpoint device over a network;

to implement a key capture agent configured to interface with an operating system of the first endpoint device;

to collect, via the key capture agent, key material associated with a session key utilized to encrypt packets sent by the first endpoint device to the second endpoint device over the network as part of a corresponding session;

to transmit the key material and an identifier of the corresponding session from the first endpoint device to the server for delivery to a first decoder that is not part of the first or second endpoint devices so as to permit the first decoder to be configured to decrypt the encrypted packets in intercepted network traffic;

to receive in the server the key material and the identifier of the corresponding session from the first endpoint device;

to receive in the server additional key material and associated session identifiers from one or more additional endpoint devices;

to sort in the server the received key material from the first endpoint device and the one or more additional endpoint devices; and to distribute from the server different portions of the sorted key material to respective different ones of a plurality of decoders including the first decoder.

19. The computer program product of claim 18 wherein the key capture agent is configured to select one of a plurality of supported key material collection modes responsive to detection of a particular type of secure connection source for the session.

20. The computer program product of claim 18 wherein transmitting the key material and identifier for delivery to the first decoder comprises transmitting the key material and identifier in a manner that ensures that the first decoder can obtain the associated session key within a specified time window.

* * * * *